Dec. 22, 1959   A. GRUGET ET AL   2,918,061
BREATHING APPARATUS
Filed Nov. 26, 1956   2 Sheets-Sheet 1

INVENTORS
JACQUES-YVES COUSTEAU
EMILE GAGNAN
ANDRE GRUGET
By Stone, Boyden & Mack
ATTORNEYS Dec. 22, 1959   A. GRUGET ET AL   2,918,061
BREATHING APPARATUS Filed Nov. 26, 1956   2 Sheets-Sheet 2

INVENTORS
JACQUES-YVES COUSTEAU
EMILE GAGNAN
By ANDRE GRUGET

Stone, Boyden & Mack
ATTORNEYS

United States Patent Office 2,918,061
Patented Dec. 22, 1959

2,918,061

BREATHING APPARATUS

André Gruget, Meudon, and Jacques-Yves Cousteau, Paris, France, and Emile Gagnan, Montreal, Quebec, Canada, assignors to La Spirotechnique, Paris, France Application November 26, 1956, Serial No. 624,408

Claims priority, application France December 2, 1955

5 Claims. (Cl. 128—142)

The present invention concerns breathing apparatus, and more particularly apparatus for deep sea diving, in which the pressure of the air admitted to the respiratory tracts of the diver is controlled by a pressure regulator having a diaphragm subjected, on its inner face, to the air pressure and on its outer face to the pressure of the surrounding water. In its position of equilibrium, this diaphragm leaves closed an air inlet valve for air from the source. The opening of this valve is caused by the breathing in of the diver which creates a depression on the side of the inner face of the diaphragm and destroys the equilibrium thereof. The depression to be exerted by the diver for opening the air inlet valve is all the greater as the positive difference between the water pressure at the center of pressure on the thorax and the water pressure at the thrust center on the diaphragm of the pressure regulator is greater. It is obviously not practicable to place the regulator at the center of pressure on the thorax, and its minimum distance possible with respect to that center is of such an order of magnitude that, in the relative, unfavorable positions of the regulator and diver, the latter experiences a substantial hindering for breathing in.

The respiratory apparatus which this invention has in view may be of the general type shown in U.S. Patent 2,485,039, in which the exhaled air is discharged directly into the water through a valve placed near the outer surface of the diaphragm of the pressure regulator, such regulator being shown herein.

The main object of the invention is to obviate this drawback and to that effect it consists chiefly in loading the diaphragm of the air pressure regulator with a weight equal, in principle, to the thrust, over the effective area of the diaphragm of a column of water having, as a height, the distance between the center of thrust of the diaphragm and the pressure center of the diver's thorax, this weight acting on the diaphragm in the direction for opening the valve for admitting air to the pressure regulator as long as the center of pressure of the thorax is located at a level lower than the thrust center of the diaphragm.

The expression "thrust center on the diaphragm" designates the point at which a force applied on the diaphragm is equal to the total thrust exerted by the water on the total surface of this diaphragm. For a circular diaphragm, this point is the center of the circle represented by this diaphragm.

The weight on the diaphragm may be lower or higher than that which would compensate exactly the effect of the height of water equal to the distance between the thrust centers of the diaphragm and thorax. If it is less than that value, it relieves the diver only partly, but has a favorable action however; if it is slightly higher it will deliver air, under a slight overpressure to the diver when the latter is swimming face downwards with the pressure regulator on his back.

It will be understood that with a pressure regulator thus improved, the depression to be exerted by the diver for breathing in is independent of the difference in level of the thrust centers of the water on the thorax and on the diaphragm of the regulator. The thrusts on each face of the diaphragm are balanced exactly in all positions of the diver, so that the depression to be exerted when breathing in for opening the air inlet valve may be extremely small since, in principle, it reduces to the operating depression in air.

When applying this principle characteristic of the invention to the breathing apparatus units in which the diver breathes out through a valve placed in the vicinity of the outer face of the diaphragm of the regulator, or even placed on that diaphragm, the air tends to escape through that valve as long as the difference in pressures between the inner and outer faces of the diaphragm is positive. For preventing these leakages and according to the invention, there is combined with the breathing out valve proper which opens in the direction of flow of the breathed out gas, a second valve arranged upstream on the same breathing out channel but opening in the opposite direction to the first valve under the control of the diaphragm of the pressure regulator when pushed back by the diver's effort for breathing out. The two valves may also be coupled by a rigid link, the first valve being deformable for allowing the second one to open under the control of the diaphragm of the regulator.

The accompanying drawings represent, by way of example only, a form of embodiment of the invention applied to a breathing apparatus in which the breathing out valve is placed in the vicinity of the wet face of the regulator diaphragm.

The air pressure regulator of the breathing apparatus for divers of the type considered by the invention is a diaphragm type regulator with one face of the diaphragm exposed to the pressure of the surrounding water and the other one to the air pressure in the respiratory tracts of the diver. The position of equilibrium of the diaphragm, in which the air inlet valve it controls is closed, corresponds to equality between the thrust of the water on its wet face and the air thrust on its dry face. This amounts to saying that the air pressure in the respiratory tracts of the diver is constantly equal to the pressure of the water at the center of thrust of the diaphragm. This center of thrust cannot, obviously, coincide with the center of thrust of the water on the chest of the diver and there results the drawbacks set forth above and which it is an object of this invention to eliminate.

Figure 1:
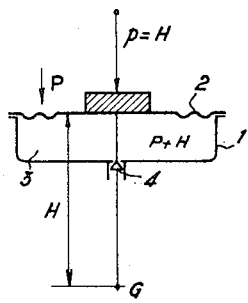
Figures 1 to 4 are explanatory diagrams of the basic characteristic of the invention.

In Figure 1, the air pressure regulator 1 is placed on the back of the diver assumed to be placed flat on his stomach in such a position that the center of thrust of the diaphragm 2 and the center of pressure G of the thorax are on one vertical. The respiratory tracts of the diver are in permanent communication with the cavity 3 of the regulator and the pressure in the thorax and in this cavity should balance the diaphragm 2 in a position which corresponds to the origin of the opening of the air inlet valve 4 controlled by the membrane. This valve controls the feeding of air into the cavity 3 from the source consisting generally of a cylinder of air compressed under a high pressure and carried by the diver.

In known breathing apparatus of the general type contemplated, the pressure inside the cavity 3 and the respiratory tracts is substantially equal to the pressure P of the water on the wet face of the diaphragm. As a result, for breathing in, the diver has to overcome the thrust applied to his chest and unbalanced, which corresponds to a water column of a height H. If, however, according to the invention, the diaphragm 2 is loaded with a weight $p$ of such a value that it exerts on that diaphragm a unit pressure corresponding to the water head H, the diaphragm 2 takes its equilibrium position defined above when the pressure in the cavity 3 of the regulator and the respiratory tracts of the diver is equal to $P+H$, i.e. when the pressure in the respiratory tracts corresponds to the pressure of the water on the thorax at G.

Figure 2:
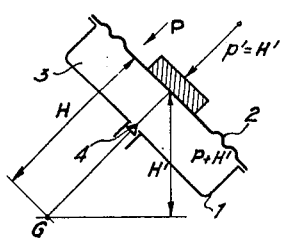

This condition is met, by means of the invention, for all the relative positions of the regulator and of the center of pressure G during the evolutions of the diver. In Figure 2 the center G is still below the center of thrust of the water on the diaphragm 2 but at a vertical distance H' from the latter center. The pressure inside the cavity 3 of the regulator has become $P+H'$, the weight $p'$ (referred to a unit area) which acts on the diaphragm 2 is equal to the component of the weight $p$ along the perpendicular on the center of the diaphragm and it corresponds to the component along the vertical of the water column H.

Figure 3:
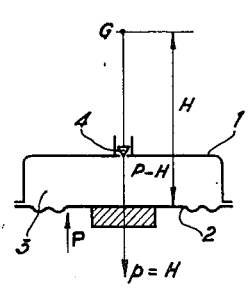
Figure 4:
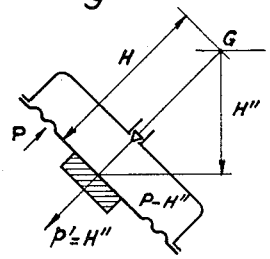

When the center of pressure G is located above the center of thrust of the diaphragm 2 and on the same vertical as the latter center (Figure 3), the pressure inside the cavity 3 of the regulator becomes $P-H$; it becomes $P-H''$ with $H''$ equal to the component along the vertical of the water column H in the case of Figure 4. In all cases, the pressure in the respiratory tracts of the diver is equal to the pressure of the water at the center of pressure on the chest of the diver. This center of pressure is obviously a purely theoretical notion; in practice the value of the weight $p$ is determined by experience, the value adopted being that which gives the diver the greatest ease for breathing.

Figure 5:
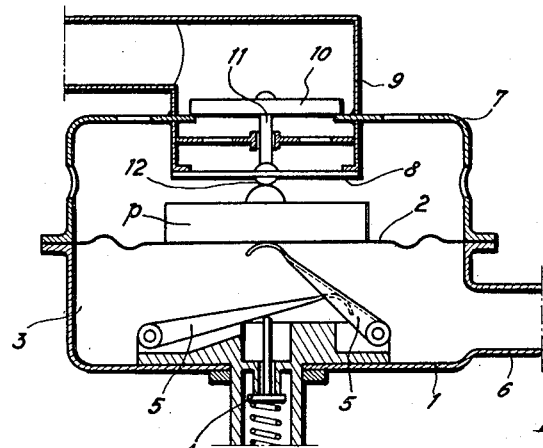
Figure 5 is a diagrammatic axial section of the pressure regulator with two coupled breathing out valves.

When the invention is applied to breathing apparatus in which the breathing out valve is placed at the vicinity of the center of thrust of the diaphragm of the regulator, it is important to provide means for avoiding air leakages through this valve in all cases when the pressure of water on the breathing out valve is less than the pressure inside the cavity 3 of the regulator and inside the respiratory tracts of the diver (case of Figures 1 and 2). To this end, and according to one of the features of the invention, the breathing out valve proper is duplicated by a valve placed upstream and which is applied against its seat by the air pressure in the regulator and respiratory tracts. An example of embodiment of such an arrangement is shown schematically in Figure 5. There is found again, in that figure, the improved pressure regulator which has been mentioned already with its diaphragm 2 loaded with the weight $p$ and which controls, by a system of levers 5, the valve 4 for admitting air into the cavity 3 in permanent communication with the respiratory tracts through a connection 6. The wet face of the diaphragm 2 is arranged under a casing 7 provided with holes for the passage of water. According to the invention, the breathing out valve 8 or an equivalent member which, in this example of embodiment, is placed at the outlet from a breathing out conduit 9 connected with the casing 7, is combined with a second valve 10 which the pressure in the cavity 3 and in the respiratory tracts of the diver tends to bring back onto its seat.

In the example shown, the valve 8 consists of a thin disc capable of undergoing elastic deformations without offering any substantial reactions. This disc carries a rigid central rod 11 which connects it with the valve 10 constituted preferably by a rigid disc. The valve 10, owing to a stop 12 is lifted by the swelling of the diaphragm 2 when the latter is pushed back in its direction.

The operation is as follows:

For breathing out, the diver, by blowing, destroys the equilibrium of the diaphragm 2 which, due to its area much larger than that of the valve 10, lifts the latter by acting on the rod 11, the displacement of which is allowed by the flexibility of the valve 8. The latter opens under the action of the positive difference between the thrusts applied on its faces and breathing out takes place in water as if the valve 8 were alone. At the end of breathing out, the valve 8 resumes its initial shape and the valve 10 comes back on its seat.

During the breathing in phase, no air leakage, is possible, the two valves 8 and 10 opening in opposite directions and the valve 10 not being lifted by the diaphragm.

Figure 6:
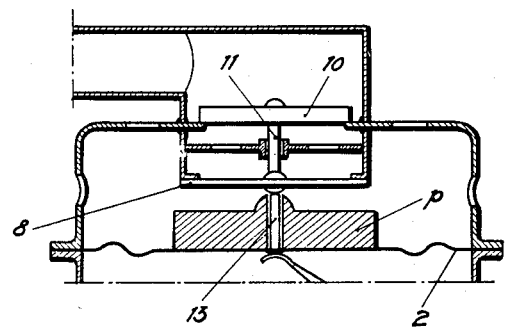
Figure 6 shows the upper portion of the pressure regulator of Figure 5 for a modified embodiment in which the weight on the diaphragm of the regulator acts on the latter only in the direction for opening the air inlet valve.

In the above, it has been assumed that the weight $p$ was coupled with the diaphragm 2 so as to act on it in all positions of the diver and breathing apparatus. The weight and diaphragm could be coupled in such a manner that the first one acts on the second one only in the positions corresponding to Figures 1 and 2, the link between the weight $p$ and the diaphragm 2 being omitted in the positions of Figures 3 and 4. To this end, recourse may be had to the example of embodiment of Figure 6 in which the weight $p$ can slide along a rod 13 secured to the diaphragm 2. When the apparatus is in the position of Figure 3, the diaphragm 2 is released of the weight $p$ and the air supply pressure is that which corresponds to the water pressure on the wet face of the diaphragm, i.e. the air in the diver's lungs remains in over pressure. It is unimportant that the weight $p$ by sliding on the rod 13 opens the valve 10 by pressing on the rod, as the valve 8 remains closed by the pressure of the surrounding water.

It would be possible, obviously, to substitute, for the device described any other arrangement making it possible to obtain the effect which consists in opposing the outlet of air through the breathing out valve when the pressure of the surrounding water on said breathing out valve is less than the pressure on the dry face of the diaphragm of the pressure regulator. It would be possible, in particular, to use only a simple breathing out valve of the duck-bill type for instance, provided with a locking device controlled by the diaphragm of the pressure regulator.

Figure 7:
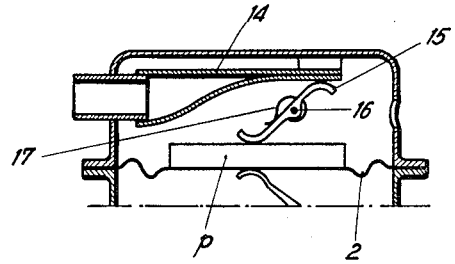
Figure 7 shows, in vertical section, the upper portion of a pressure regulator which comprises a locking device for the breathing out valve.

This case is shown in Figure 7. The breathing out valve 14 of the duck bill type, is locked in its closed condition by a lever 15 hinged at a fixed point 16 and urged in the valve locking position by a spring 17. The valve 14 remains locked as long as the diaphragm 2 is in its equilibrium position or depressed by the breathing in of the diver. When the diaphragm is swelled by the diver's breathing out, the weight $p$ acts on the lever 15 for unlocking the valve 14 and allowing it to open.

What we claim is:

1. In a breathing apparatus for divers of the type provided with an air pressure regulator having an air supply valve controlled by a diaphragm the outer face of which is submitted to the pressure of the surrounding water and with a breathing out valve located near to the outer face of the diaphragm, said breathing out valve opening in the direction of the breathed out air, the combination with said breathing out valve of a second breathing out valve opening in a direction opposite to that of the first one, and adapted to be opened by the pressure regulator diaphragm when said diaphragm is swelled by the diver's breathing out.

2. In a breathing apparatus for divers of the type provided with an air pressure regulator having an air supply valve controlled by a diaphragm the outer face of which is submitted to the pressure of the surrounding water and with a breathing out valve located near to the outer face of said diaphragm, the improvement consisting in coupling with said breathing out valve which opens in the direction of flowing of the breathed out air, a second breathing out valve which opens in a direction opposite to that of the first breathing out valve, the first breathing out valve being distortable for allowing the diaphragm of the pressure regulator to open the second breathing out valve without opening said first breathing out valve.

3. In a breathing apparatus for divers of the type provided with an air pressure regulator having an air supply valve controlled by a diaphragm the outer face of which is submitted to the pressure of the surrounding water and with a breathing out valve located near to the outer face of the diaphragm, in combination, a device adapted to lock the breathing out valve in its closed condition and means interposed between said device and diaphragm and adapted to release said breathing out valve for allowing it to open when the diaphragm is swelled out by the breathing out of the diver.

4. In a breathing apparatus for divers of the type provided with an air pressure regulator having an air supply valve controlled by a diaphragm the outer face of which is submitted to the pressure of the surrounding water and with a breathing out valve located near to the outer face of the diaphragm, in combination, a lever pivoted at a fixed point and resilient means provided for urging said lever so as to lock the breathing out valve in its closed condition, said lever being adapted to be operated by the diaphragm in order to release said breathing out valve for allowing it to open when said diaphragm is swelled out by the breathing out of the diver.

5. In a breathing apparatus for divers, in air pressure regulator having a flexible diaphragm the outer face of which is submitted to the pressure of the surrounding water, an air supply valve controlled by said diaphragm, a breathing out valve located near the outer face of the diaphragm, and a dense material disc rigidly secured to one of the diaphragm faces and adapted to apply to said diaphragm a thrust which is a component of the weight of said disc, for compensating the effect of the variations of the vertical distance between the center of the diaphragm and the pressure center of water on the thorax of the diver.

References Cited in the file of this patent

UNITED STATES PATENTS

| | | |
|---|---|---|
| 2,420,375 | Huggenberger | May 13, 1947 |
| 2,615,463 | Burns | Oct. 28, 1952 |
| 2,695,609 | Nourse et al. | Nov. 30, 1954 |
| 2,787,280 | Arpin | Apr. 2, 1957 |
| 2,872,919 | Rosset | Feb. 10, 1959 |

FOREIGN PATENTS

| | | |
|---|---|---|
| 645,056 | Germany | May 20, 1937 |
| 715,838 | Great Britain | Sept. 22, 1954 |